R. H. GRAY & A. F. STAHLHUT.
WATER PURIFYING OR SOFTENING SYSTEM.
APPLICATION FILED JUNE 19, 1914.

1,159,929.

Patented Nov. 9, 1915.
2 SHEETS—SHEET 1.

WITNESSES:
Margarethe Tegeder
Metz Brandenburger

INVENTORS.
Ross H. Gray and
August F. Stahlhut
BY Taylor & Hulse
ATTORNEYS.

R. H. GRAY & A. F. STAHLHUT.
WATER PURIFYING OR SOFTENING SYSTEM.
APPLICATION FILED JUNE 19, 1914.

1,159,929.

Patented Nov. 9, 1915.
2 SHEETS—SHEET 2.

WITNESSES:
Margarethe Tegeder
M. H. Brandenburger

INVENTORS.
Ross H. Gray and
August F. Stahlhut
BY Taylor & Hulse
ATTORNEYS.

UNITED STATES PATENT OFFICE.

ROSS H. GRAY AND AUGUST F. STAHLHUT, OF FORT WAYNE, INDIANA.

WATER PURIFYING OR SOFTENING SYSTEM.

1,159,929. Specification of Letters Patent. Patented Nov. 9, 1915.

Application filed June 19, 1914. Serial No. 846,010.

*To all whom it may concern:*

Be it known that we, Ross H. GRAY and AUGUST F. STAHLHUT, citizens of the United States, residing at Fort Wayne, in the county of Allen and State of Indiana, have invented new and useful Improvements in Water Purifying or Softening Systems, of which the following is a specification.

The invention relates to water purifying or softening systems and especially to devices for regulating and controlling the feed of chemicals to the water to be softened or purified.

In most water softening or purifying systems heretofore in use, the chemicals with which the water is treated are liquids or in solution, and complicated mechanisms are required to feed the liquids in proper quantities.

The chief object of our invention is to eliminate this complicated mechanism by feeding, directly to the water to be treated, dry chemicals preferably in a more or less powdered state, the operations being carried on by very simple mechanisms.

Another object is to provide novel means for feeding the chemicals to the water and to control the rate of feed of the chemicals from the hoppers or containers in which they are stored.

In the accompanying drawings we illustrate the features of our invention in which—

Figure 1:
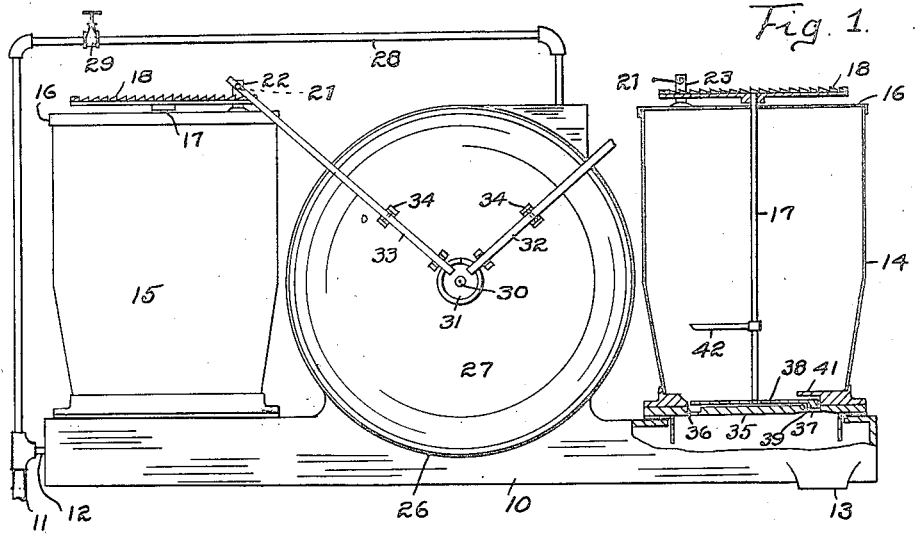
Figure 2:
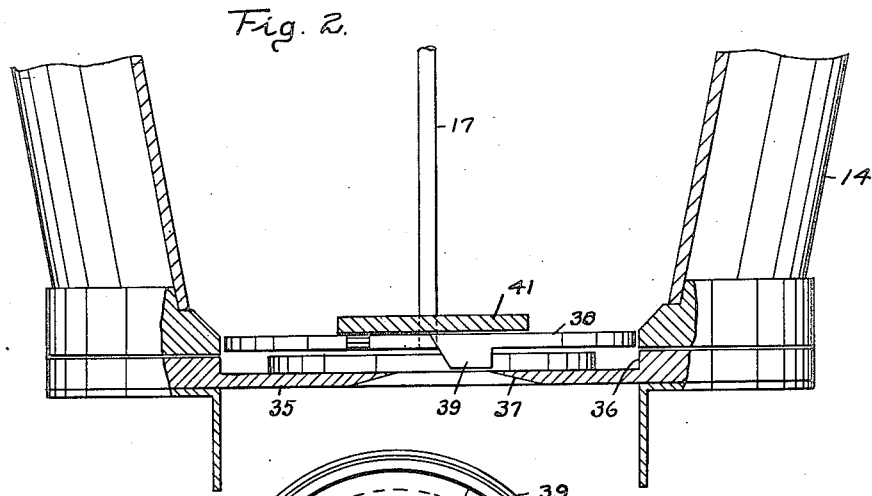
Figure 3:
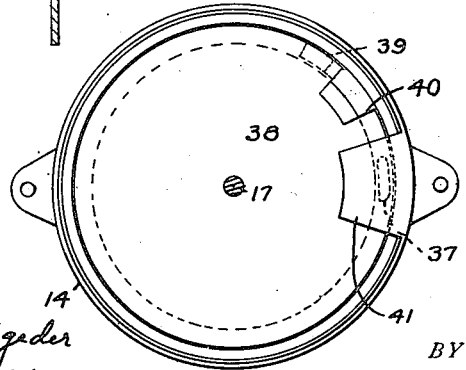
Figure 4:
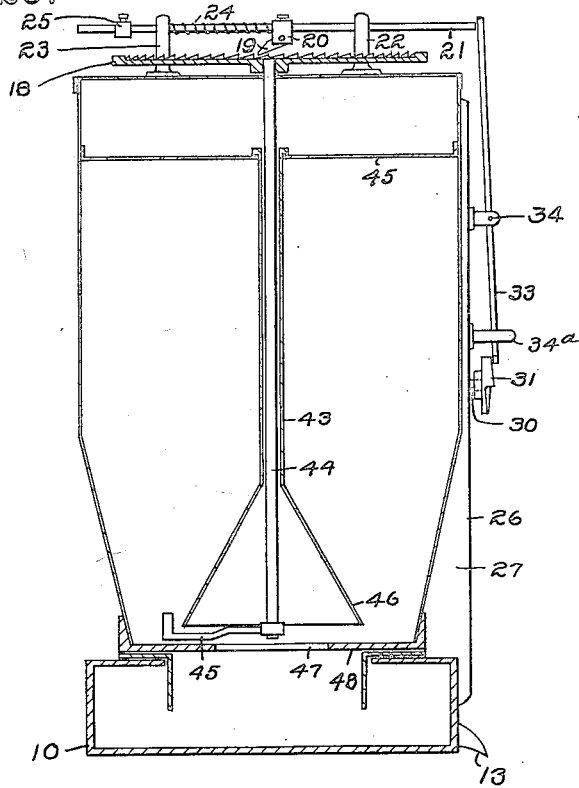

Figure 1 is a side elevational view of the mechanism in a preferred arrangement and form; Fig. 2 a fractional vertical section of one of the hoppers, on an enlarged scale; Fig. 3 a plan view of the feeding mechanism of the same hopper; Fig. 4 a vertical central section of the hopper showing a modified form of feeding mechanism and Fig. 5 a plan view of the bottom of the hopper and scraper of Fig. 4.

Referring to the drawings 10 represents a conductor or treating chamber through which water to be treated is permitted to flow. The water preferably enters at one end of the chamber and discharges at or near the opposite end.

11 is the source of water supply, a branch 12 connecting said supply to chamber 10. The discharge opening 13 in the conductor or chamber permits the treated water to escape to a suitable precipitating tank from which it is taken by the user.

Adjacent either end of the conductor are the hoppers 14, 15 in which the chemicals are placed, each hopper having a discharge opening in its bottom through which the chemical is discharged into the mixing chamber. The cover 16 of each hopper is removable for the insertion of the chemicals. The upper end of a revoluble shaft 17 projects through a suitable opening in cover 16 and secured to said projecting end is a circular rack 18. A dog 19 (Fig. 4) pivotally carried by a block 20 is in engagement with the teeth of the rack. Block 20 is adjustably mounted on a rod 21 which is slidably carried by brackets 22, 23 which are fixed to cover 16. A spring 24 is coiled about rod 21, one end abutting bracket 23, the other end abutting block 20, consequently as the rod is reciprocated toward bracket 23, spring 24 will be placed in tension and will return the rod and dog to their normal position when rod 21 reaches the end of its stroke. A stop 25 is adjustably mounted on rod 21 on the opposite side of bracket 23 from spring 24. This stop limits the retracting movement of rod 21 and it and block 20 may be adjusted on the rod to limit and regulate the stroke of the rod.

Between the hoppers is provided a suitable water wheel 26 which is mounted in a suitable casing 27 supported by the wall of chamber 10. The wall of chamber 10 is omitted within casing 27 so that wheel 26 projects a short distance down in chabmer 10. A pipe 28, having a regulating valve 29 therein, connects the water supply 11 to the top of casing 27 from which the water is discharged onto the wheel as water is supplied to the well known over-shot water well, the water escaping into chamber 10. One end of shaft 30 of the wheel projects exteriorly of the casing and on the extension is fixed a cam 31. Two levers 32, 33 are pivotally mounted at 34 on the casing, the lower ends abutting the surface of the cam and the upper ends abutting the ends of rods 21, respectively, suitable guide brackets 34ᴬ on the casing serving to retain the two levers in proper position.

The bottom 35 of each hopper is provided with a circular groove 36, and at a suitable point in the bottom of the groove is provided the feed opening 37. Above the bottom and secured to the lower end of shaft 17 is a plate 38 having a depending beveled lug 39, which lug, as the plate is rotated, travels in the groove 36. The plate is cut out in front of lug 39 to provide a suitable aperture 40 through which the chemical will fall into groove 36 and be scraped or driven along in the groove as the plate is rotated. A guard 41 projects from bottom 35 over feed opening 37, and prevents the chemical from discharging through the feed opening except when forced through it by lug 39.

A stirring rod or piece 42 may be secured to shaft 17 for loosening up the chemical.

As the water wheel is rotated, cam 31, as it passes behind the end of first one lever and then the other rocks the levers. This movement of the levers causes rods 21 to reciprocate, the dogs thereon engaging the racks and causing the latter to rotate a predetermined distance, (the distance of one or more teeth) according to the height of the cam surface and the length of the lever arms. The rotation of the racks is imparted to the shafts and to the plates so that upon each rotation of the water wheel the plates will be rotated a predetermined amount to cause a predetermined amount of chemical to be discharged through the feed openings at predetermined points of time; that is, one discharge for each revolution of the plate.

Figure 5:
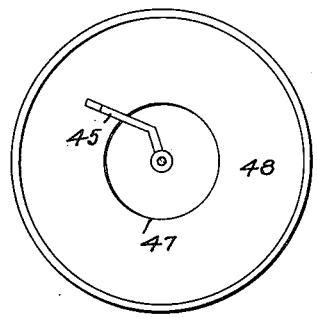

In Figs. 4 and 5 we illustrate another form of discharge controlling device, which in some cases may be preferred to the former controlling device. In this form we provide a tube 43 which encircles shaft 44, the upper end being supported by a bar 45 which is secured to the wall of the hopper, the lower end being flared. The upper end of the shaft is secured to rack 18, as is shaft 17 and to the lower end is secured a laterally extending bar or other suitable member 45 which serves to scrape the chemical under the flared end 46 of tube 43. A central feed opening 47 is provided in the bottom 48 of the hopper and the flared end of tube 43 is considerably larger in diameter at its lower edge than the diameter of the feed opening so that it will prevent the chemical from escaping through the feed opening except when the scraper bar forces the chemical under the guard and into the feed opening. The scraper bar is driven intermittently just as plate 38 is driven.

We may use plate 38 with feed opening 37 in both hoppers, or guard 46 and feed opening 47 in both hoppers, or one form of said mechanism in one hopper and the other form in the other hopper. We prefer to use the plate in hopper 14 and for certain purposes prefer to use guard 46 and feed opening 47 in hopper 15.

It is apparent that as the water motor controls the feed of the chemicals the feed is proportional to the speed of the motor and to control this speed it is essential that the supply of water to the wheel be controlled by some suitable device, as valve 29, which is arranged in pipe 28. The speed of the motor will thereby be regulated and the feed controlled as desired.

Numerous modifications in the details of construction of the various parts of our invention will be readily suggested to one skilled in the art, but we believe all such to be within the scope of our invention.

What we claim is:

1. In a system of the class described the combination with a treating chamber having an opening therein for the entrance of the treating chemical, a hopper, a base on the hopper having an aperture therein for the discharge of treating chemical from the hopper into the treating chamber, the bottom also having an annular channel in its upper face into which the aperture opens, a guard carried by the base and projecting laterally over the aperture, a vertical shaft revolubly supported in the hopper, a disk secured to the lower end of the shaft having an aperture in register with the channel and having a depending member which projects into the channel, a rack secured to the upper end of the shaft, and a rotor operatively connected to the rack for rotating the shaft at predetermined intervals of time.

2. The combination with a treating chamber of two hoppers secured to the chamber and having communication therewith, fixed means within the hoppers to control the latter communications, vertically supported revoluble shafts in the hoppers each having fixed means thereon for driving material within the hopper, through the said communications, racks secured to the upper ends of the shafts, a rotor having a fixed cam upon its shaft, two pivotally mounted levers in contact at one end with the cam, the other ends carrying a pawl respectively which engage the racks respectively, the cam, racks and levers being so proportioned that the two shafts are driven in succession and at predetermined intervals of time.

In witness whereof we hereto affix our names this 15th day of June, 1914.

ROSS H. GRAY.
AUGUST F. STAHLHUT.

Witnesses:
E. M. HULSE,
J. N. TAYLOR.